(12) United States Patent
Loginov

(10) Patent No.: US 8,264,483 B2
(45) Date of Patent: Sep. 11, 2012

(54) APPROXIMATION OF ORDERED SETS OF POINTS BY GEOMETRIC ELEMENTS VIA OVERLAPPING POLYTOPES

(75) Inventor: Igor Vadimovich Loginov, Moscow region (RU)

(73) Assignee: Topcon GPS, LLC, Oakland, NJ (US)

( * ) Notice: Subject to any disclaimer, the term of this patent is extended or adjusted under 35 U.S.C. 154(b) by 792 days.

(21) Appl. No.: 12/356,147

(22) Filed: Jan. 20, 2009

(65) Prior Publication Data
US 2009/0184965 A1    Jul. 23, 2009

Related U.S. Application Data

(60) Provisional application No. 61/011,978, filed on Jan. 23, 2008.

(51) Int. Cl.
*G06F 17/00* (2006.01)
*G06T 15/00* (2006.01)

(52) U.S. Cl. ............ 345/418; 345/419; 345/441

(58) Field of Classification Search ........... 345/418, 345/419, 427, 441
See application file for complete search history.

(56) References Cited

U.S. PATENT DOCUMENTS

| | | | |
|---|---|---|---|
| 3,069,654 A | 12/1962 | Hough | |
| 5,081,689 A | 1/1992 | Meyer et al. | |
| 5,566,288 A | 10/1996 | Koerhsen | |
| 7,152,022 B1 | 12/2006 | Joshi | |
| 2007/0179685 A1 | 8/2007 | Milam et al. | |
| 2007/0182739 A1* | 8/2007 | Platonov et al. | 345/427 |
| 2008/0068380 A1* | 3/2008 | McAvoy et al. | 345/428 |
| 2011/0141115 A1* | 6/2011 | Brandes et al. | 345/428 |

OTHER PUBLICATIONS

PCT International Search Report corresponding to PCT Application PCT/US2009/000281 filed Jan. 20, 2009 (3 pages).
PCT Written Opinion of the International Searching Authority corresponding to PCT Application PCT/US2009/000281 filed Jan. 20, 2009 (7 pages).
Itoh, Koichi, et al., "A Curve Fitting Algorithm for Character Fonts", Electronic Publishing, Wiley, Chichester, GB. vol. 6, No. 3, Sep. 1, 1993, pp. 195-205.

* cited by examiner

*Primary Examiner* — Chante Harrison
(74) *Attorney, Agent, or Firm* — Wolff & Samson PC

(57) ABSTRACT

An ordered set of physical points, each comprising a nominal point and an associated allowable deviation, is approximated by a sequence of geometric elements determined by a method of intersecting polytopes in a parametric space. A first bundle of geometric elements connecting a first subgroup of physical points is generated and mapped to a first polytope. A second bundle of geometric elements connecting a second subgroup of physical points is generated and mapped to a second polytope. If the intersection between the first polytope and the second polytope is not null, the points in the intersection region correspond to geometric elements which approximate the physical points in the combined two subgroups. The process is repeated iteratively for additional subgroups. The center point of the final intersection region corresponds to an approximate best-fit geometric element.

20 Claims, 12 Drawing Sheets

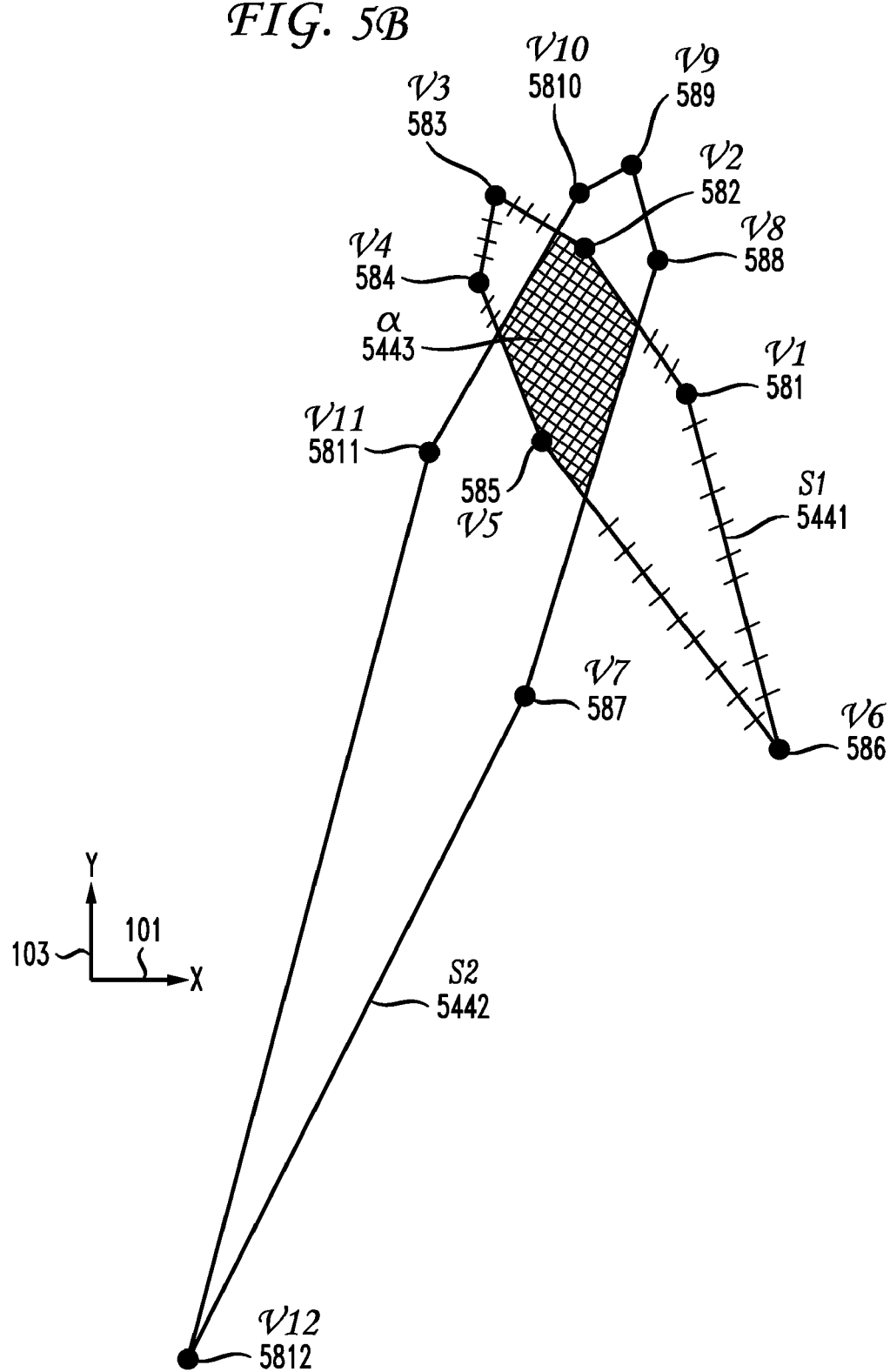

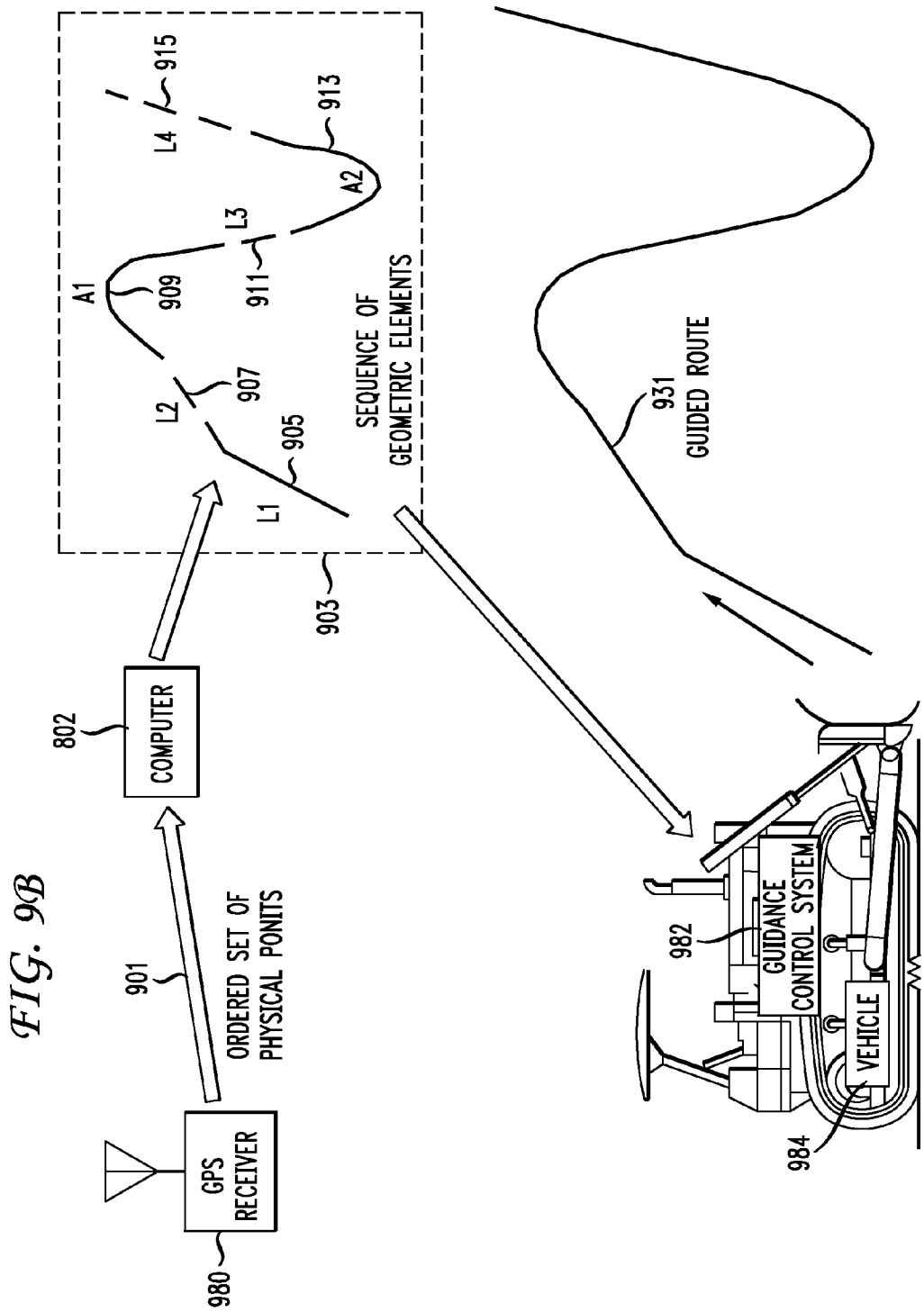

APPROXIMATION OF ORDERED SETS OF POINTS BY GEOMETRIC ELEMENTS VIA OVERLAPPING POLYTOPES

This application claims the benefit of U.S. Provisional Application No. 61/011,978 filed Jan. 23, 2008, which is incorporated herein by reference.

BACKGROUND OF THE INVENTION

The present invention relates generally to approximation of an ordered set of points by a series of geometric elements, and more particularly to approximation of an ordered set of points in which the position of each point is determined with a non-zero accuracy.

In diverse applications, geometric features may be represented as an ordered set of points. In land surveying, roads, rivers, and boundaries of territories may be delineated by ordered sets of points. In computer vision systems, the boundaries of objects may be delineated by ordered sets of points. In digital image processing, the contours of objects in an image may be represented by ordered sets of points (pixels). Analyzing raw sets of points requires computer systems with high power processors, large memory, and complex algorithms. More efficient analysis may be achieved by approximating a set of points with a series of geometric elements. For example, a road may be modelled as a chain (sequence) of segments. Basic segments include straight line segments and circular arcs. If needed, more complex geometric curves may be used to smoothly transition between adjacent segments. In addition to more efficient analysis, approximation by a series of geometric elements provides a mechanism for data compression: the raw set of points may be characterized by a smaller set of geometric parameters. For example, a series of points falling on a straight line segment may be characterized by the coordinates of the two end points of the segment. Similarly, a series of points falling on a circular arc may be characterized by the coordinates of the two end points of the arc and the coordinates of a third point lying on the arc.

Note that a point is a geometric abstraction. In real applications, a particular position may be determined within a non-zero accuracy. In land surveying, for example, accuracy is a function of the resolution and errors in the measurement system (and other factors). In a digital imaging system, accuracy is a function of pixel size of the digital image (and other factors). In data compression, accuracy is a function of the value of acceptable (user-defined) loss of information, which may be described by the compression ratio (and other factors). What is needed is a method for approximating an ordered set of points, in which the position of each point has a non-zero accuracy, with a series of geometric elements.

BRIEF SUMMARY OF THE INVENTION

In an embodiment of the invention, the approximation of an ordered set of physical points in physical space is performed by a method of intersecting polytopes in a parametric space. Each physical point comprises a nominal point and an associated allowable deviation. A first bundle of geometric elements connecting a first subgroup of physical points selected from the ordered set of physical points is generated. The deviation of each geometric element in the first bundle from each nominal point in the first subgroup is not greater than the allowable deviation associated with each nominal point in the first subgroup. The first bundle is then mapped to a first polytope in a parametric space, wherein each geometric element in the first bundle is mapped to a corresponding parametric point in the first polytope. A second bundle of geometric elements connecting a second subgroup of physical points selected from the ordered set of physical points is generated. The deviation of each geometric element in the second bundle from each nominal point in the second subgroup is not greater than the allowable deviation associated with each nominal point in the second subgroup. The second bundle is then mapped to a second polytope in the parametric space, wherein each geometric element in the second bundle is mapped to a corresponding parametric point in the second polytope. If the intersection between the first polytope and the second polytope is not null, the points in the intersection region correspond to geometric elements which approximate the physical points in the combined two subgroups. The center of the intersection region corresponds to an approximate best-fit geometric element which approximates the physical points in the first two subgroups.

These and other advantages of the invention will be apparent to those of ordinary skill in the art by reference to the following detailed description and the accompanying drawings.

BRIEF DESCRIPTION OF THE DRAWINGS

FIG. 3B shows the last three points joined by a second bundle of circular arcs);

FIG. 5B shows a plot in physical space of two bundles of circular arcs mapped to center points of circles corresponding to the circular arcs;

FIG. 9B shows a schematic of a vehicle directed by a guidance control system.

DETAILED DESCRIPTION

Figure 1:
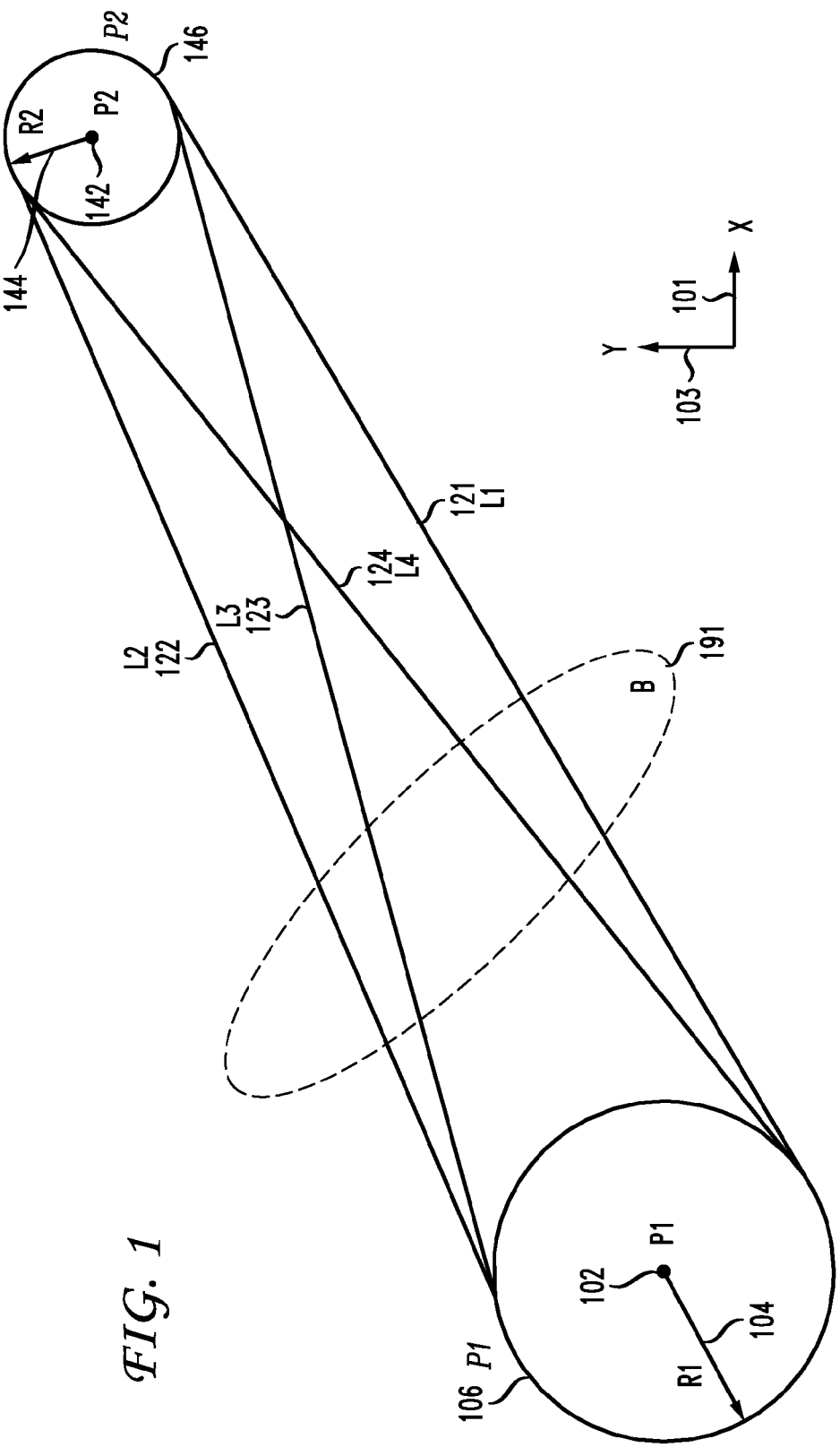
FIG. 1 shows a plot in physical space of two physical points joined by a bundle of straight line segments.

A position in real space (also referred to as physical space) may be specified by the coordinates of a point relative to a reference frame. For example, relative to a standard Cartesian X-Y-Z reference frame, a point P may be represented by the coordinates $(x_P, y_P, z_P)$. A mathematical point is dimensionless. In real practice, however, a physical point is spatially distributed; that is, the location of a physical point is determined within a non-zero range, which may depend on a number of factors, such as the resolution and stability of the measurement system and environmental conditions (which include temperature, pressure, humidity, shock, and vibration). For some measurement systems, thermal noise, electromagnetic noise, and electromagnetic interference may also come into play. A physical point P may then be represented by the coordinates $(x_P \pm \Delta x_P, y_P \pm \Delta y_P, z_P \pm \Delta z_P)$, where $(\Delta x_P, \Delta y_P, \Delta z_P)$ represent the accuracy with which $(x_P, y_P, z_P)$ may be determined. In general, $(\Delta x_P, \Delta y_P, \Delta z_P)$ is not constant, but may vary with $(x_P, y_P, z_P)$. In two dimensions, physical point P may then be represented by a rectangular region $(x_P \pm \Delta x_P, y_P \pm \Delta y_P)$. Similarly, in three dimensions, physical point P may be represented by a rectangular prism $(x_P \pm \Delta x_P, y_P \pm \Delta y_P, z_P \pm \Delta z_P)$.

In an embodiment of the invention, the accuracy is considered to be isotropic because the appropriate linear scaling of coordinates yields $\Delta x_P = \Delta y_P = \Delta z_P$ approximately for all points in a scaled frame. If scaling is not performed, then for each physical point P, the values of $\Delta x_P, \Delta y_P$, and $\Delta z_P$ may all be set to the minimum value of $(\Delta x_P, \Delta y_P, \Delta z_P)$. Physical point P may then be represented by a circular region in two dimensions and by a sphere in three dimensions. In two dimensions, physical point P may be represented by $[P_P(x_P, y_P), R_P]$, where $P_P(x_P, y_P)$ is the center point of the circle and $R_P$ is the radius of the circle. Similarly, in three dimensions, physical point P may be represented by $[P_P(x_P, y_P, z_P), R_P]$, where $P_P(x_P, y_P, z_P)$ is the center point of the sphere and $R_P$ is the radius of the sphere. Herein, $P_P$ is also referred to as the corresponding nominal point of physical point P, and $R_P$ is also referred to as the allowable deviation associated with physical point P and associated with nominal point $P_P$. The nominal point and the allowable deviation may be determined by various means. For example, the nominal point may be a single instrument reading, and the allowable deviation may be the accuracy specified by a calibration procedure. The nominal point and the allowable deviation may also be determined statistically by taking multiple measurements. For example, the nominal point may be specified by the mean or median, and the allowable deviation may be specified by the standard deviation or by the extremal values.

In an embodiment of the invention, an ordered set of physical points, each having a corresponding nominal point and an associated allowable deviation, may be approximated by a chain (sequence) of simple geometric elements, such as straight line segments and circular arcs. More complicated curves may be used, depending on the application. Each element in the chain approximates the maximum number of consecutive physical points such that the deviation of each element from each physical point is within the allowable deviation associated with the physical point. Herein, the deviation of an element from a physical point refers to the deviation of the element from the nominal point corresponding to the physical point. Herein, the group of physical points approximated by a single element is referred to as the subgroup of physical points associated with the element.

The same subgroup of physical points may be approximated by more than one element. Herein, the set of elements which may approximate the same subgroup is referred to as a bundle of elements. Herein, an element within a bundle is referred to as a member element of the associated bundle. Each member element has the same shape, but different geometric parameters. For example, if a bundle comprises a set of straight line segments, each member element may have a different value for slope and intercept. If a bundle comprises circular arcs, each member element may have a different center point and radius.

In an embodiment of the invention, each member element in a bundle is mapped to a parametric point. For straight line segments, parametric points are defined in a user-specified parametric space with user-specified parametric coordinates.

A bundle is therefore a manifold of elements in physical space, and the manifold of elements may be mapped to a manifold of parametric points in parametric space. To simplify the discussion and drawings, two-dimensional space is used in the examples. Embodiments for three-dimensional space are summarized after the detailed examples for two-dimensional space have been presented. In two dimensions, the manifold of parametric points forms a region in the two-dimensional parametric space. In an embodiment of the invention, the region is approximated by a polygon, and all points within the polygon are members of the manifold of parametric points from parametric space.

An example for elements comprising straight line segments is first discussed, with reference to FIG. 1, FIG. 2, FIG. 4, and FIG. 7. An example for elements comprising circular arcs is then discussed, with reference to FIG. 3A, FIG. 3B, FIG. 5A, and FIG. 5B.

FIG. 1 illustrates a simple geometric configuration comprising two adjacent physical points, P1 106 (with nominal point P1 102 and radius R1 104) and P2 146 (with nominal point P2 142 and radius R2 144). The coordinates of the points are measured with respect to the X-Axis 101 and the Y-Axis 103 in physical space. The radius R1 104 represents the allowable deviation from nominal point P1 102, and the radius R2 144 represents the allowable deviation from nominal point P2 142. Physical point P1 106 and physical point P2 146 are connected by a bundle B 191 of straight line segments. The outer limits of bundle B 191 are straight line segment L1 121 and straight line segment L2 122. Straight line segment L3 123 and straight line segment L4 124 are the straight line segments which define the bounds of the range of slope.

Figure 2:
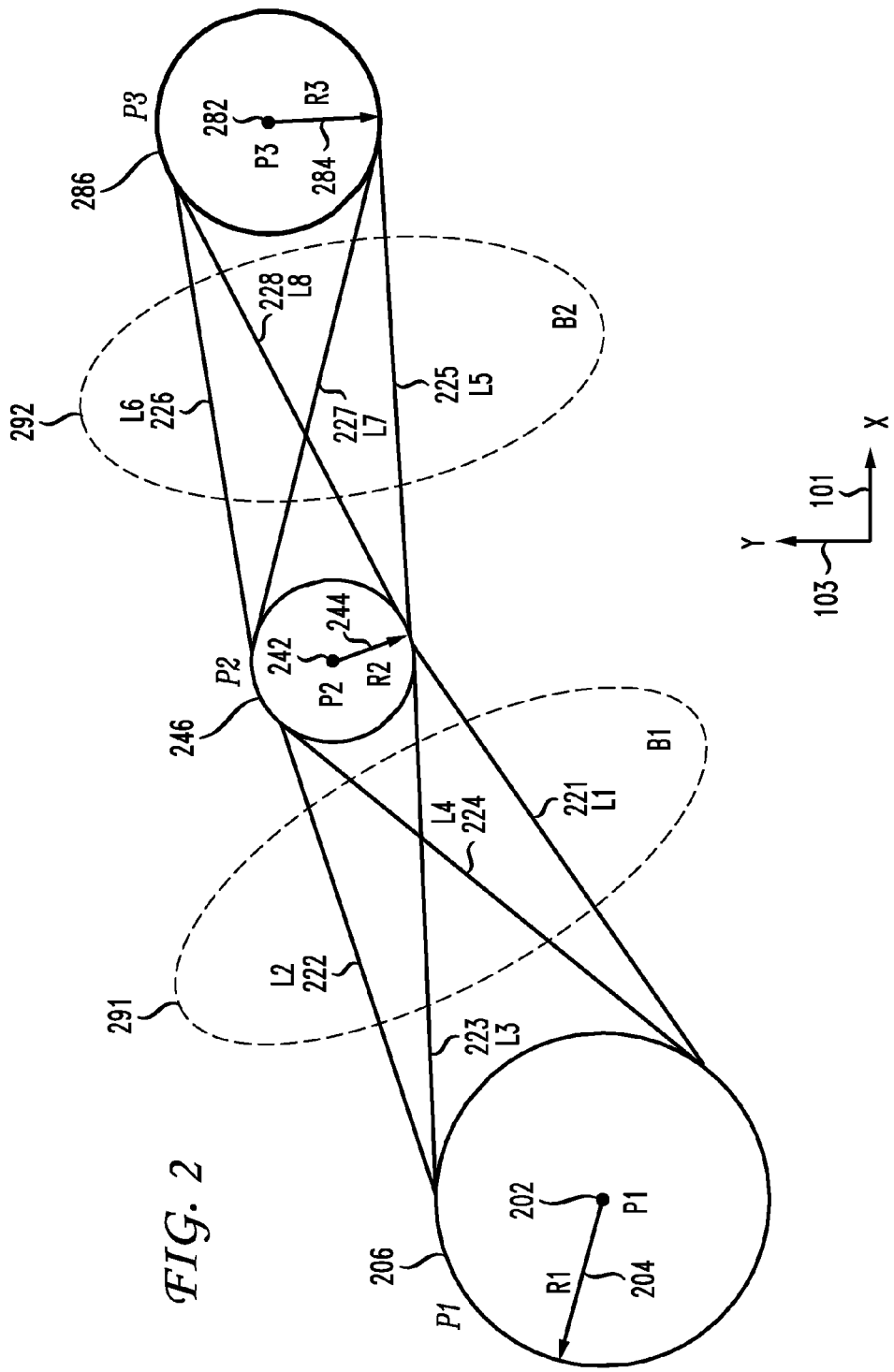
FIG. 2 shows a plot in physical space of three physical points joined by two bundles of straight line segments.

In FIG. 2, there are three physical points in sequence, P1 206 (with nominal point P1 202 and radius R1 204), P2 246 (with nominal point P2 242 and radius R2 244), and P3 286 (with nominal point P3 282 and radius R3 284). Physical point P1 206 and physical point P2 246 are connected by a first bundle B1 291 of straight line segments. The outer limits of bundle B1 291 are straight line segment L1 221 and straight line segment L2 222. Straight line segment L3 223 and straight line segment L4 224 are the straight line segments which define the bounds of the range of slope within bundle B1 291. Similarly, physical point P2 246 and physical point P3 286 are connected by a second bundle B2 292 of straight line segments. The outer limits of bundle B2 292 are straight line segment L5 225 and straight line segment L6 226. Straight line segment L7 227 and straight line segment L8 228 are the straight line segments which define the bounds of the range of slope within bundle B2 292.

In physical space (FIG. 2), the straight line segments within each bundle fall on the straight lines defined by a set of general linear equations:

$$A^*x + B^*y + C = 0, \qquad (E1)$$

where A, B, C are linear coefficients.

Figure 4:
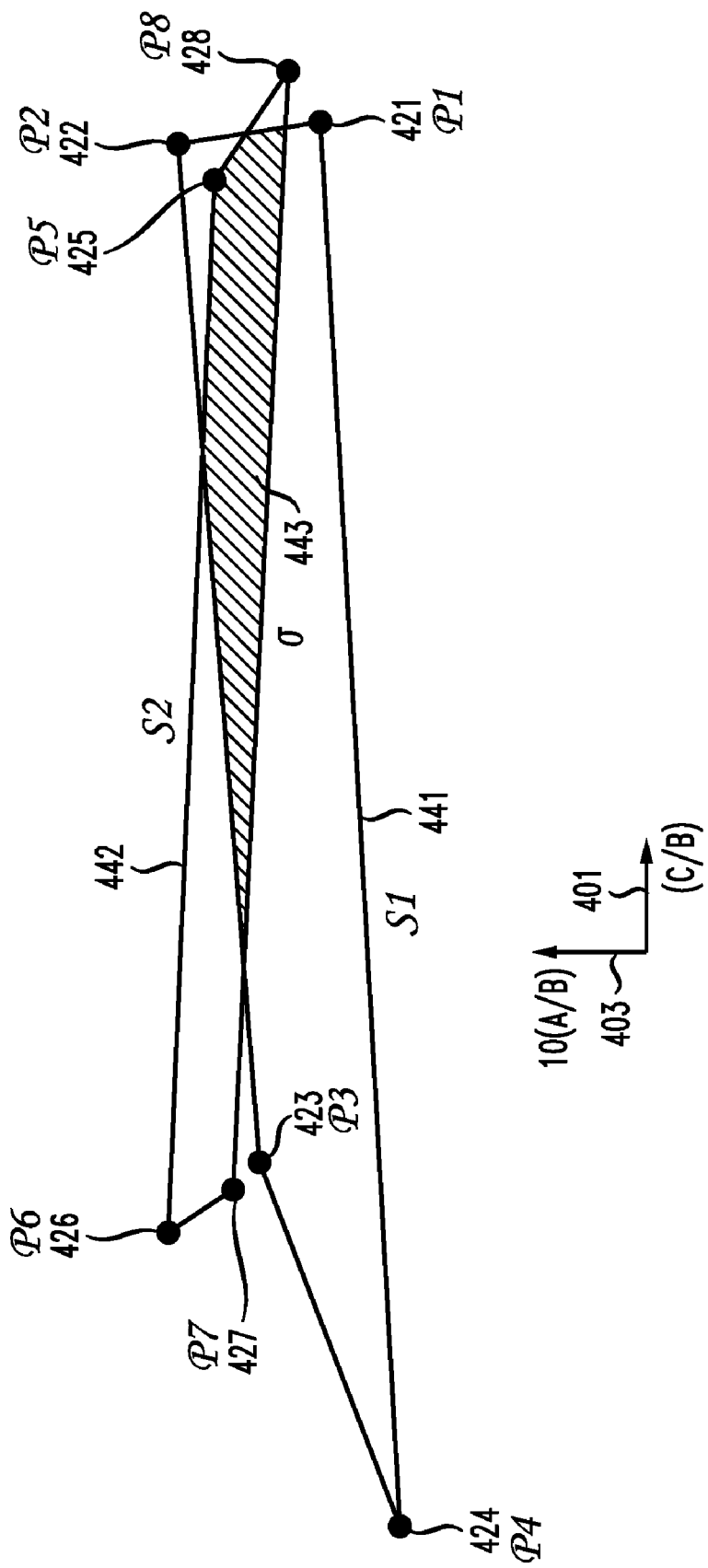
FIG. 4 shows a plot in parametric space of two bundles of straight line segments mapped to parametric points that form two polygons.

FIG. 4 shows an example of a corresponding plot in a user-defined parametric space. In the embodiment shown in FIG. 4, the horizontal axis (abscissa) is (C/B) 401, and the vertical axis (ordinate) is (A/B) 403. The coordinates of a point $\varphi$ in the parametric space are then $[(C/B)_\varphi, (A/B)_\varphi]$. Note that the vertical axis in FIG. 4 is scaled by a factor of 10 to show sufficient detail. In FIG. 4, each plotted parametric point corresponds to a straight line segment in FIG. 2:

$\varphi 1\ 421 \leftrightarrow L1\ 221$
$\varphi 2\ 422 \leftrightarrow L2\ 222$
$\varphi 3\ 423 \leftrightarrow L3\ 223$

𝒫4 424 ↔ L4 224
𝒫5 425 ↔ L5 225
𝒫6 426 ↔ L6 226
𝒫7 427 ↔ L7 227
𝒫8 428 ↔ L8 228.

The polygon S1 441 defined by the vertices 𝒫1 421, 𝒫2 422, 𝒫3 423, and 𝒫4 424 (FIG. 4) corresponds to the bundle B1 291 of straight line segments connecting physical point P1 206 and physical point P2 246 (FIG. 2). That is, each point within the polygon S1 441 corresponds to a straight line segment within the bundle B1 291. Similarly, the polygon S2 442 defined by the vertices 𝒫5 425, 𝒫6 426, 𝒫7 427, and 𝒫8 428 (FIG. 4) corresponds to the bundle B2 292 of straight line segments connecting physical point P2 246 and physical point P3 286 (FIG. 2). That is, each point within the polygon S2 442 corresponds to a straight line segment within the bundle B2 292. In FIG. 4, the overlap region σ 443 represents the intersection between polygon S1 441 and polygon S2 442. Each parametric point within the overlap region σ 443, therefore, corresponds to a straight line segment which connects physical point P1 206, physical point P2 246, and physical point P3 286 (FIG. 2). The deviation of each straight line segment from each of nominal point P1 202, nominal point P2 242, and nominal point P3 282 is less than or equal to the allowable deviation associated with each nominal point.

Figure 7:
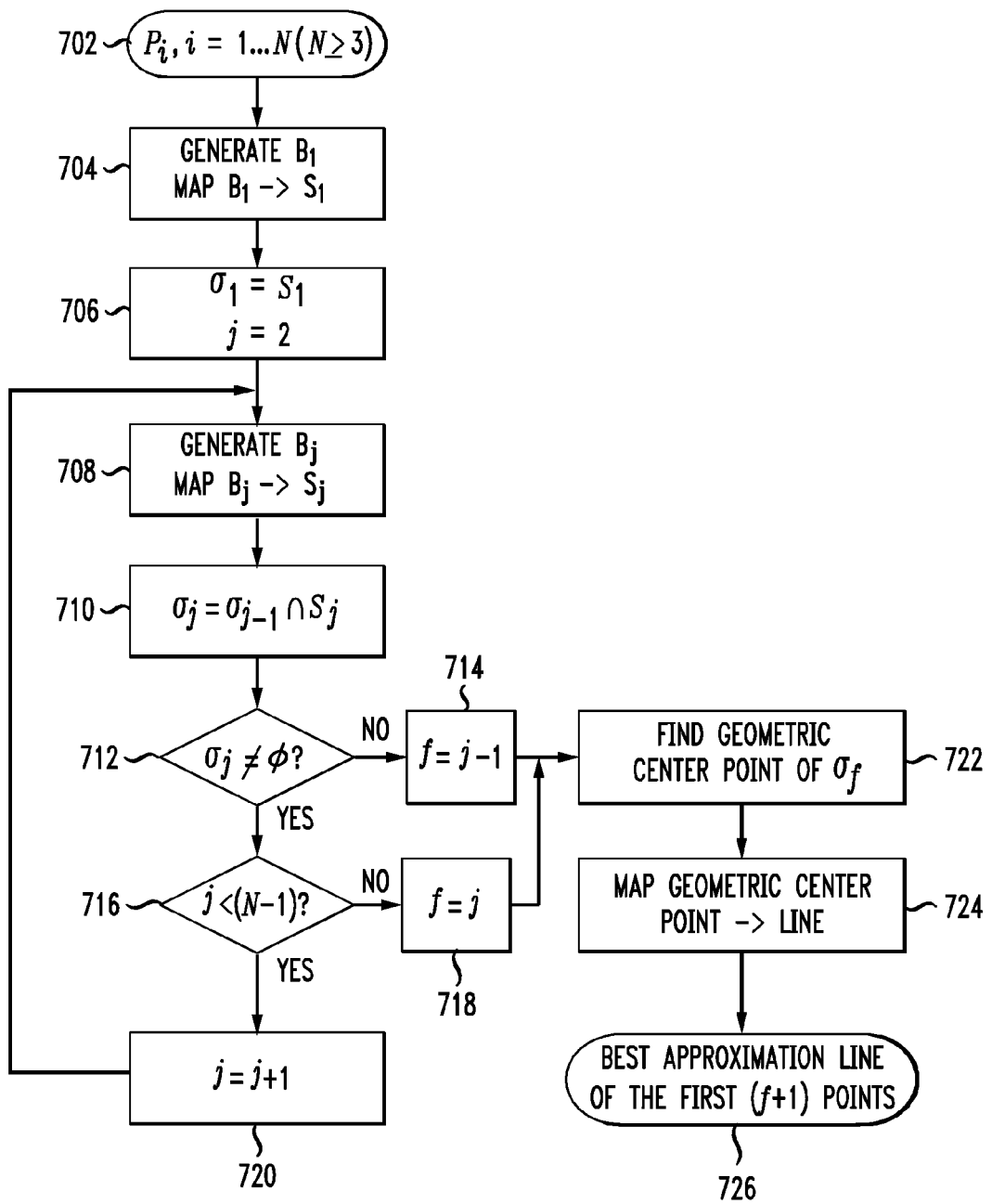
FIG. 7 shows a flowchart of steps for determining an approximate best-fit straight line segment that approximates an ordered set of physical points, according to an embodiment of the invention.

The process may be repeated for additional adjacent physical points, as described in the flowchart of FIG. 7. The input 702 to the process is an ordered set of physical points $P_i$, i= 1 . . . N, N≧3. Physical point $P_i$ is represented by corresponding nominal point $P_i$ and associated allowable deviation (radius) $R_i$. In step 704, bundle $B_1$ is generated and mapped to polygon $S_1$ in parametric space:

$$B_1 \to S_1.$$

Bundle $B_1$ comprises a set of straight line segments connecting physical point $P_1$ and physical point $P_2$ such that the deviation of each straight line segment from nominal point $P_1$ is less than or equal to the allowable deviation $R_1$, and the deviation of each straight line segment from nominal point $P_2$ is less than or equal to the allowable deviation $R_2$.

In step 706, the initial intersection region $\sigma_1$ is assigned the value of $S_1$. The index j is initialized to the value of 2. The index j is the index of the bundle of straight line segments which connect a pair of points $(P_j, P_{j+1})$; therefore, the maximum value of j is (N−1). In step 708, bundle $B_j$ is generated and mapped to polygon $S_j$ in parametric space:

$$B_j \to S_j.$$

In step 710, the intersection $\sigma_j$ is defined as the intersection of $\sigma_{j-1}$ and $S_j$ (denoted as $\sigma_{j-1} \cap S_j$):

$$\sigma_j = \sigma_{j-1} \cap S_j.$$

The process then passes to step 712, in which the intersection $\sigma_j$ is checked to determine whether it is null. If the intersection $\sigma_j$ is null, then the process passes to step 714, in which the final index f is defined as the value of (j−1) in order to designate the previous non-null intersection. The process then passes from step 714 to step 722, which is discussed further below. In step 712, if the intersection $\sigma_j$ is not null, then the process passes to step 716. In step 716, the index j is checked to determine whether all N points of the point set (input 702) have been processed. If all N points have been processed, then the process passes to step 718, in which the final index f is defined as the value of j. The process then passes from step 718 to step 722. If all N points have not been processed (step 716), then the process passes to step 720, in which the index j is incremented by 1 to designate the current non-null intersection.

The sequence of steps (step 708, step 710, step 712, step 716, and step 720) is repeated until the new intersection is null (step 712) or until all N points have been processed (step 716). The process then passes to step 722, in which the nominal geometric center point of the final intersection region $\sigma_f$ is determined. In general, the final intersection region is a polygon in which the lengths of the sides are not necessarily equal and in which the angles between adjacent sides are not necessarily equal. The nominal geometric center point may be determined according to user-defined criteria. For example, if the polygon has a center of symmetry, the nominal geometric center point may be defined as the center of symmetry. As another example, if there is no center of symmetry, the nominal geometric center point may be defined as the center of mass of the polygon. Herein, the nominal geometric center point of a polygon is also referred to as the center of the polygon. Let the nominal geometric center point of $\sigma_f$ be designated the parametric point $\mathscr{P}_f[(C/B)_f, (A/B)_f]$. Then, in step 724, $\mathscr{P}_f[(C/B)_f, (A/B)_f]$ maps to the line $$A_f * x + B_f * y + C_f = 0 \tag{E2}$$

in physical space. The output 726 is the equation of a straight line containing a straight line segment which is an approximate best fit (see further discussion below) between the first f+1 adjacent physical points such that the deviation of the straight line segment from each of the corresponding nominal points is less than or equal to the allowable deviation associated with each nominal point.

The total number (T) of physical points which may be approximated by the final straight line segment is determined as follows:

$$[\sigma_2 = (\sigma_1 \cap S_2) \neq \emptyset; \sigma_3 = (\sigma_2 \cap S_3) = \emptyset] \to T = 3.$$

$$[\sigma_3 = (\sigma_2 \cap S_3) \neq \emptyset; \sigma_4 = (\sigma_3 \cap S_4) = \emptyset] \to T = 4.$$

$$[f \geq 2; \sigma_f = (\sigma_{f-1} \cap S_f) \neq \emptyset; \sigma_{f+1} = (\sigma_f \cap S_{f+1}) = \emptyset] \to T = f+1.$$

In an embodiment, the best-fit straight line segment is determined such that the sum of the ratios (deviation$_k$/R$_k$) is minimized, where R$_k$ is the allowable deviation for physical point P$_k$, deviation$_k$ is the absolute value of the deviation of the k-th point from the straight line segment, and the sum is taken over T physical points. In general, the best-fit straight line segment maps to a parametric point within the final non-null intersection region. In an embodiment, the final non-null intersection region is approximated by a final non-null polygon, and the center of the final non-null polygon maps to a straight line segment which closely approximates the best-fit straight line segment. This method is advantageous since determining the center of the final non-null polygon is mathematically less complex than determining the parametric point corresponding to the best-fit straight line. Consequently, fewer computational resources may be required, and computational speed may be increased.

In the embodiment of the invention shown in FIG. 4, a point in the user-defined parametric space with the parametric coordinates (C/B, A/B) was used to approximate the subgroup of points by a straight line segment. In another embodiment, a point in a user-defined parametric space with the parametric coordinates (C/A, B/A) may be used to approximate a subgroup of points by a straight line segment. Parametric coordinates (C/B, A/B) are advantageous for spatial configurations in which the straight line segments are close to the horizontal axis. Similarly, parametric coordinates (C/A, B/A) are advantageous for spatial configurations in which the straight line segments are close to the vertical axis. In general, the coordinates in parametric space are user-defined and are not necessarily Cartesian. For example, the coordinates in parametric space may be polar coordinates.

Figure 3A:
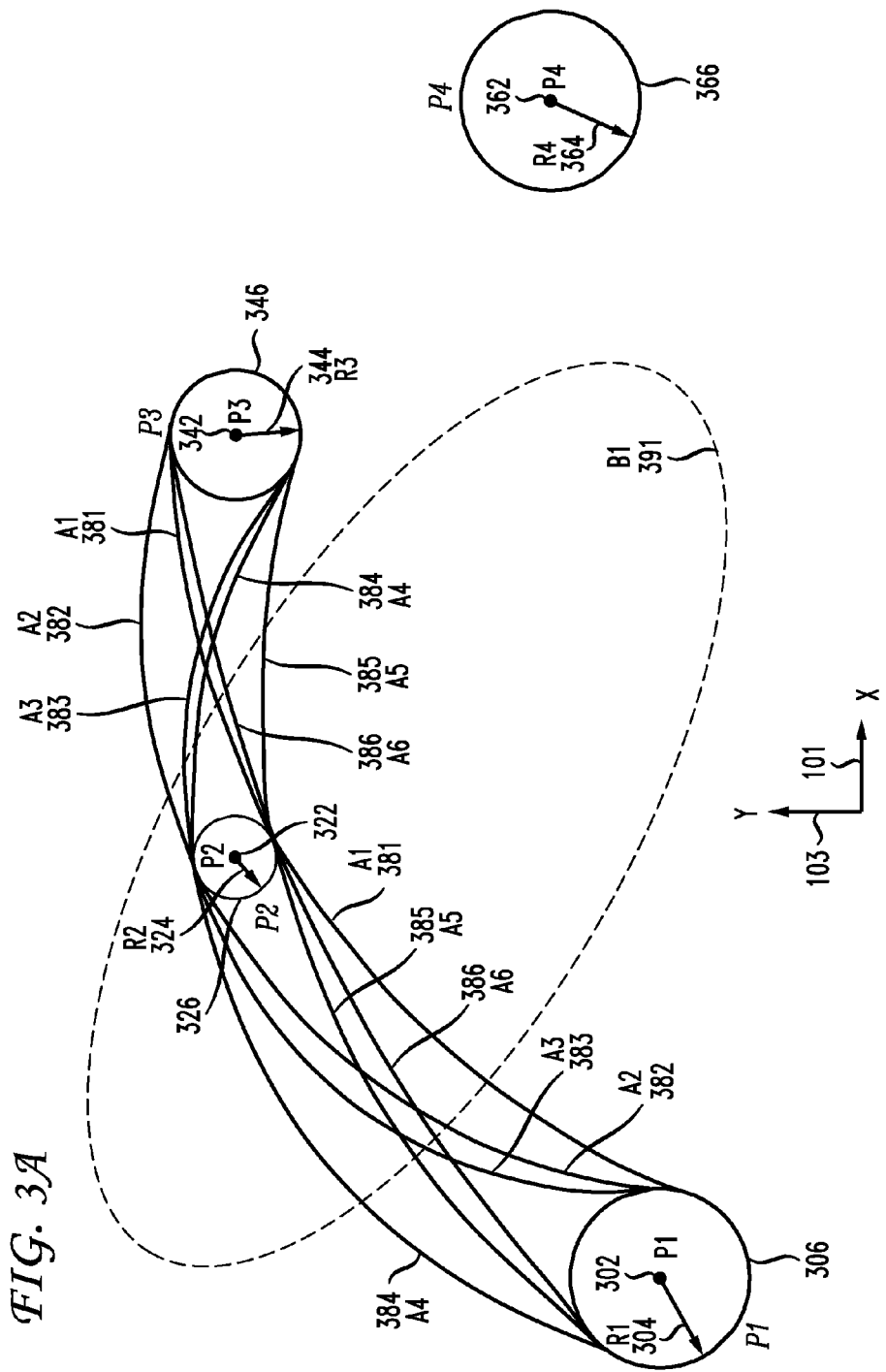
FIG. 3A and FIG. 3B show plots in physical space of four points (FIG. 3A shows the first three points joined by a first bundle of circular arcs.

FIG. 3A, FIG. 3B, FIG. 5A, and FIG. 5B show an example for elements comprising circular arcs. In FIG. 3A, there are four physical points in sequence, physical point P1 306 (with nominal point P1 302 and radius R1 304), physical point P2 326 (with nominal point P2 322 and radius R2 324), physical point P3 346 (with nominal point P3 342 and radius R3 344), and physical point P4 366 (with nominal point P4 362 and radius R4 364). In this example, the first three physical points, P1 306, P2 326, and P3 346, are connected by a bundle B1 391 of circular arcs. Circular arc A1 381-circular arc A6 386 are the outer limits of the bundle B1 391. For each circular arc within the bundle B1 391, the deviation from each of the nominal points P1 302, P2 322, and P3 342 is less than or equal to the allowable deviation associated with each nominal point (R1 304, R2 324, and R3 344, respectively).

Figure 3B:
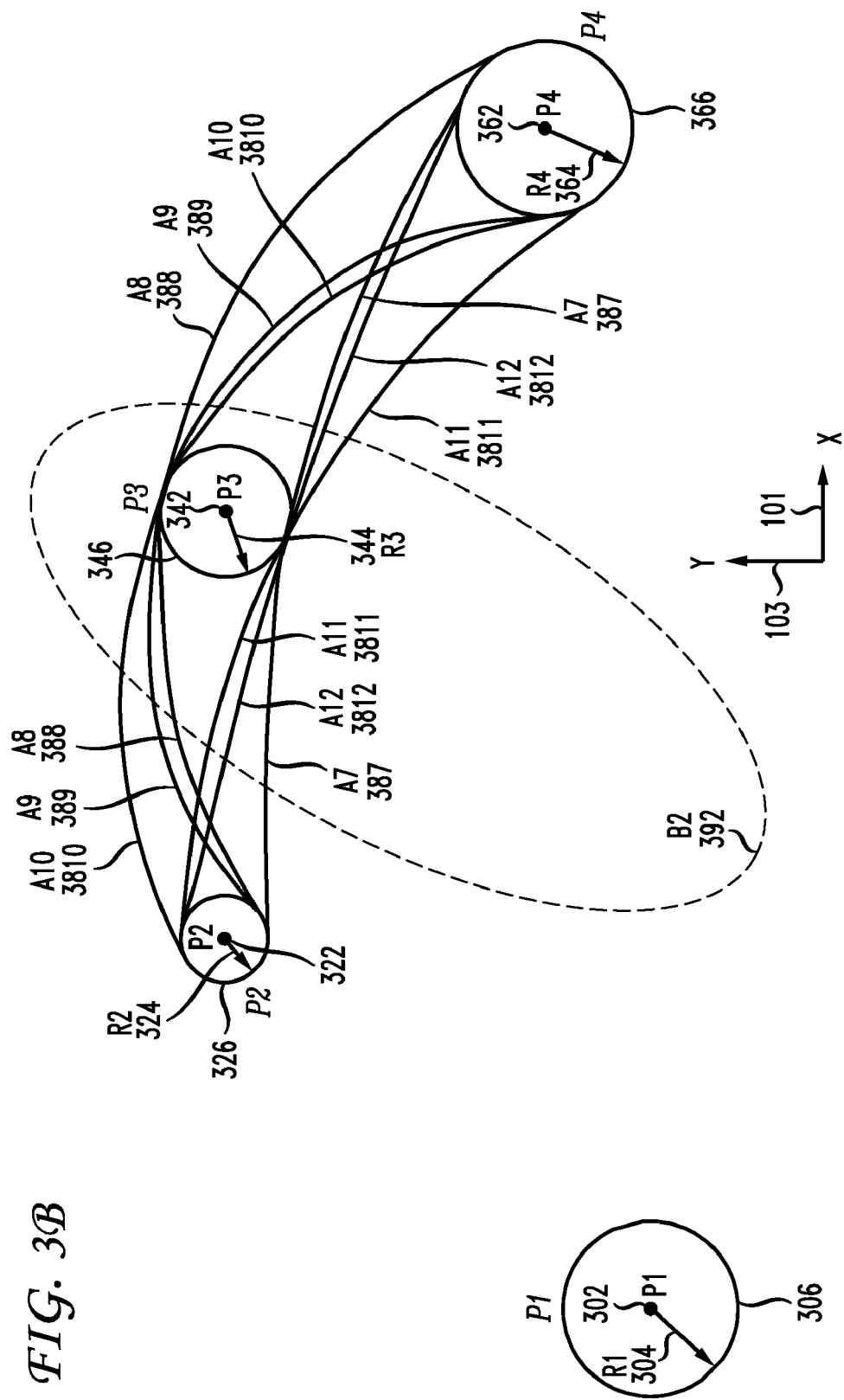

In FIG. 3B, the same sequence of four physical points, P1 306, P2 326, P3 346, and P4 366, is shown. In this example, the last three physical points, P2 326, P3 346, and P4 366, are connected by a bundle B2 392 of circular arcs. Circular arc A7 387-circular arc A12 3812 are the outer limits of the bundle B2 392. For each circular arc within the bundle B2 392, the deviation from each of the nominal points P2 322, P3 342, and P4 362 is less than or equal to the allowable deviation associated with each nominal point (R2 324, R3 344, and R4 364, respectively).

Figure 5A:
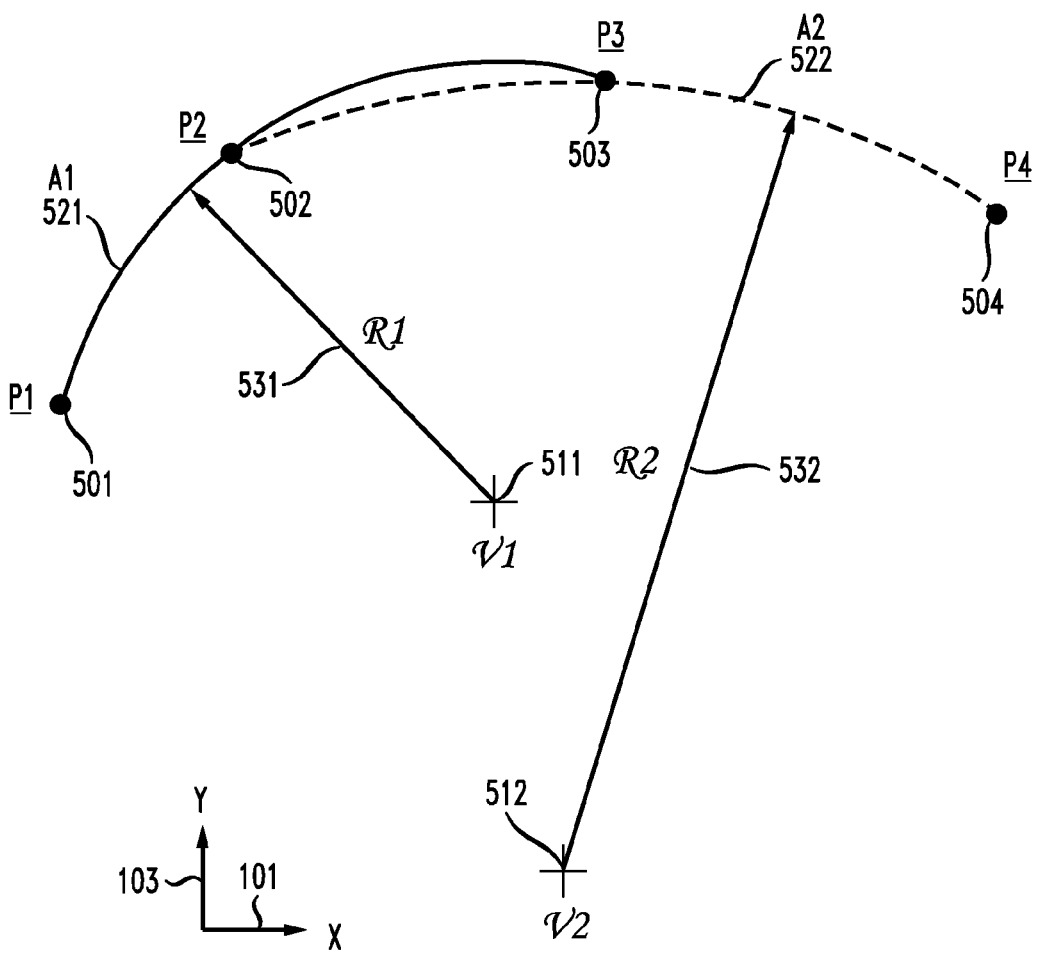
FIG. 5A shows a plot in physical space of circular arcs mapped to center points of circles corresponding to the circular arcs.

In an embodiment of the invention, a circular arc is mapped to a single parametric point in a user-defined parametric space. In one embodiment, the parametric space is also the physical space. That is, the horizontal axis (abscissa) is the X-Axis 101, and the vertical axis is the Y-Axis 103 (FIG. 3A and FIG. 3B). Non-Cartesian coordinates, such as polar coordinates, may also be used. The parametric point is the center point of the circle that corresponds to the circular arc. Herein, the center point of the circle that corresponds to a circular arc is referred to as the center of the circular arc. FIG. 5A shows examples of the mapping. In FIG. 5A, the points $\overline{PN}$, where N is an integer, denote abstract mathematical points. Points P1 501, P2 502, and P3 503 are approximated by circular arc $\overline{A1}$ 521, with center point $\mathcal{V}1$ 511 and radius $\mathcal{R}1$ 531. Points P2 502, P3 503, and P4 504 are approximated by circular arc $\overline{A2}$ 522, with center point $\mathcal{V}2$ 512 and radius $\mathcal{R}2$ 532. Circular arc A1 521 is mapped to parametric point $\mathcal{V}1$ 511, and circular arc A2 522 is mapped to parametric point $\mathcal{V}2$ 512.

FIG. 5B shows a parametric plot corresponding to the geometric plots shown in FIG. 3A and FIG. 3B. In FIG. 5B, each parametric point corresponds to the center of a circular arc (with a corresponding radius) in FIG. 3A and FIG. 3B:

$\mathcal{V}1$ 581 ↔ A1 381

$\mathcal{V}2$ 582 ↔ A2 382

$\mathcal{V}3$ 583 ↔ A3 383

$\mathcal{V}4$ 584 ↔ A4 384

$\mathcal{V}5$ 585 ↔ A5 385

$\mathcal{V}6$ 586 ↔ A6 386

$\mathcal{V}7$ 587 ↔ A7 387

$\mathcal{V}8$ 588 ↔ A8 388

$\mathcal{V}9$ 589 ↔ A9 389

$\mathcal{V}10$ 5810 ↔ A10 3810

$\mathcal{V}11$ 5811 ↔ A11 3811

$\mathcal{V}12$ 5812 ↔ A12 3812.

The polygon S1 5441 defined by the vertices $\mathcal{V}1$ 581-$\mathcal{V}6$ 586 (FIG. 5B) corresponds to the bundle B1 391 of circular arcs connecting physical point P1 306, physical point P2 326, and physical point P3 346 (FIG. 3A). That is, each point within polygon S1 5441 corresponds to the center of a circular arc within bundle B1 391. Similarly, the polygon S2 5442 defined by the vertices $\mathcal{V}7$ 587-$\mathcal{V}12$ 5812 (FIG. 5B) corresponds to the bundle B2 392 of circular arcs connecting physical point P2 326, physical point P3 346, and physical point P4 366 (FIG. 3B). That is, each point within polygon S2 5442 corresponds to the center of a circular arc within bundle B2 392. In FIG. 5B, the overlap region a 5443 represents the intersection between polygon S1 5441 and polygon S2 5442. All points within the overlap region a 5443, therefore, correspond to the centers of circular arcs which connect physical point P1 306, physical point P2 326, physical point P3 346, and physical point P4 366. The deviation of each circular arc from each of the corresponding nominal points P1 302, P2 322, P3 342, and P4 362 is less than or equal to the allowable deviation associated with each nominal point (R1 304, R2 324, R3 344, and R4 364, respectively).

The process may be repeated for additional adjacent physical points, following a sequence of steps similar to the sequence of steps for straight line segments (previously described in the flowchart of FIG. 7). Sequential polygons corresponding to sequential bundles of circular arcs are added to FIG. 5B until the intersection of the existing intersection region with the next polygon is null:

$$\alpha_f \cap S_{f+1} = \emptyset.$$

The nominal geometric center point of the final intersection region $\alpha_f$ is then determined. Let the nominal geometric center point of $\alpha_f$ be designated the parametric point $\mathcal{V}_f(x_f, y_f)$. This is the center point of the circular arc which is an approximate best fit between the first T=f+2 adjacent physical points such that the deviation of the circular arc from each of the corresponding nominal points is less than or equal to the allowable deviation associated with each nominal point. The minimum and maximum radii are then defined for each approximated point using its allowable deviation. If the overall intersection of regions of radii for passed points is not null, then a best-fit circular arc exists, and its radius is chosen to be the median value of radii range. [Note: T=f+2 in this instance because a circular arc connects three points, whereas a straight line segment connects two points.]

Figure 6:
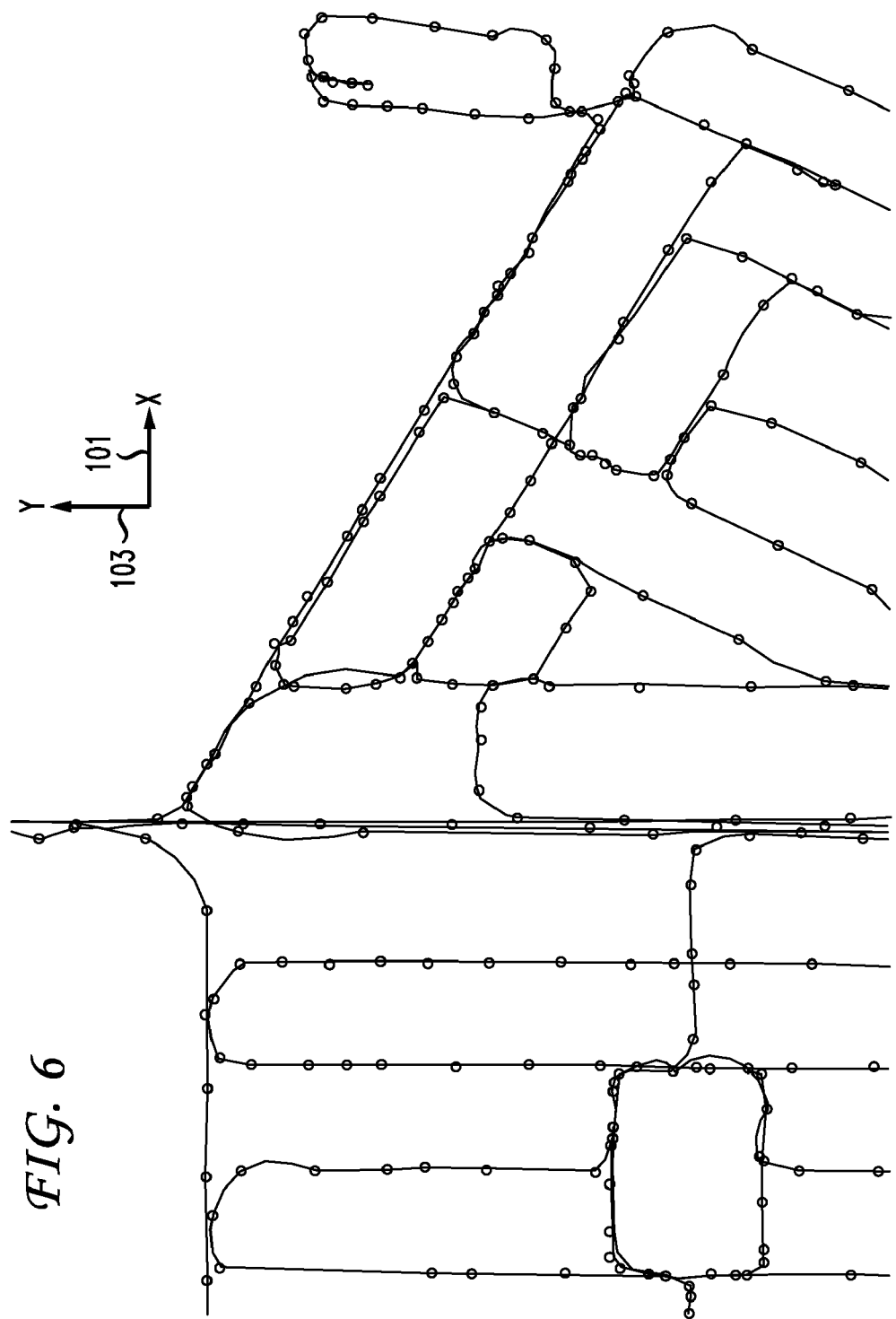
FIG. 6 shows an example of a complex ordered set of physical points approximated by a connected series of straight line segments and circular arcs.

FIG. 6 shows a complex ordered set of physical points. Each physical point is represented by a circle whose center point is the corresponding nominal point and whose radius is the associated allowable deviation. A computer program executing the methods described above has connected the physical points with approximation curves comprising a connected series of straight line segments and circular arcs.

The examples above apply to two-dimensional space. Embodiments of the invention may be applied to three-dimensional space. An ordered set of physical points in physical space is provided as input. As discussed earlier, each physical point may be represented by a sphere, with the center point located at a corresponding nominal point and a radius corresponding to an associated allowable deviation. A geometric element is selected to approximate a subgroup of adjacent physical points selected from the set of physical points. Examples of geometric elements include straight line segments and circular arcs, but more complex geometric elements may be selected, depending on the application. A bundle of geometric elements is generated to connect the subgroup of adjacent physical points. The deviation of each geometric element (in the bundle) from each corresponding nominal point is less than or equal to the allowable deviation associated with each nominal point (not greater than the allowable deviation associated with each nominal point).

Each geometric element is mapped to a parametric point in parametric space, and each bundle of geometric elements is mapped to a region in parametric space. In some instances, parametric space may be physical space. In an embodiment of the invention, the three-dimensional region is approximated by a polyhedron, and all points within the polyhedron are members of the manifold of parametric points in parametric space. Similar to the two-dimensional case, a sequence of bundles is generated. Each bundle connects sequential subgroups of physical points. Each bundle is mapped to a polyhedron in parametric space. The first bundle is mapped to a first polyhedron. The second bundle is mapped to a second polyhedron. If the first polyhedron and the second polyhedron intersect, the intersection region is referred to as the first intersection polyhedron. The points in the first intersection polyhedron map to the set of geometric elements which approximate the sequence of physical points in the combined first two subgroups of physical points. The center of the first intersection polyhedron maps to an approximate best-fit geometric element which connects the physical points in the combined first two subgroups.

The process may be iterated. A third bundle is mapped to a third polyhedron. If the third polyhedron intersects with the first intersection polyhedron, the new intersection region is referred to as the second intersection polyhedron. The points in the second intersection polyhedron map to the set of geometric elements which approximate the set of physical points in the combined first three subgroups of physical points. The center of the second intersection polyhedron maps to an approximate best-fit geometric element which connects the physical points in the first three subgroups. The iterations continue until one of the following conditions is met: (a) the intersection of the current non-null intersection polyhedron with the next polyhedron (which maps to the next bundle) is null, or (b) all physical points have been processed. The center of the final non-null intersection polyhedron maps to an approximate best-fit geometric element which connects the physical points in the combined subgroups mapped to the final non-null intersection polyhedron. The deviation of the approximate best-fit geometric element from each corresponding nominal point in the combined subgroups is less than or equal to the allowable deviation associated with each nominal point (not greater than the allowable deviation associated with each nominal point).

Herein, the term "polytope" refers to a polygon in two-dimensional space and refers to a polyhedron in three-dimensional space.

Note that different geometric elements may be used in sequence. For example, a curvilinear path may be approximated by straight line segments along nearly linear sections and by circular arcs along curved sections.

Figure 8:
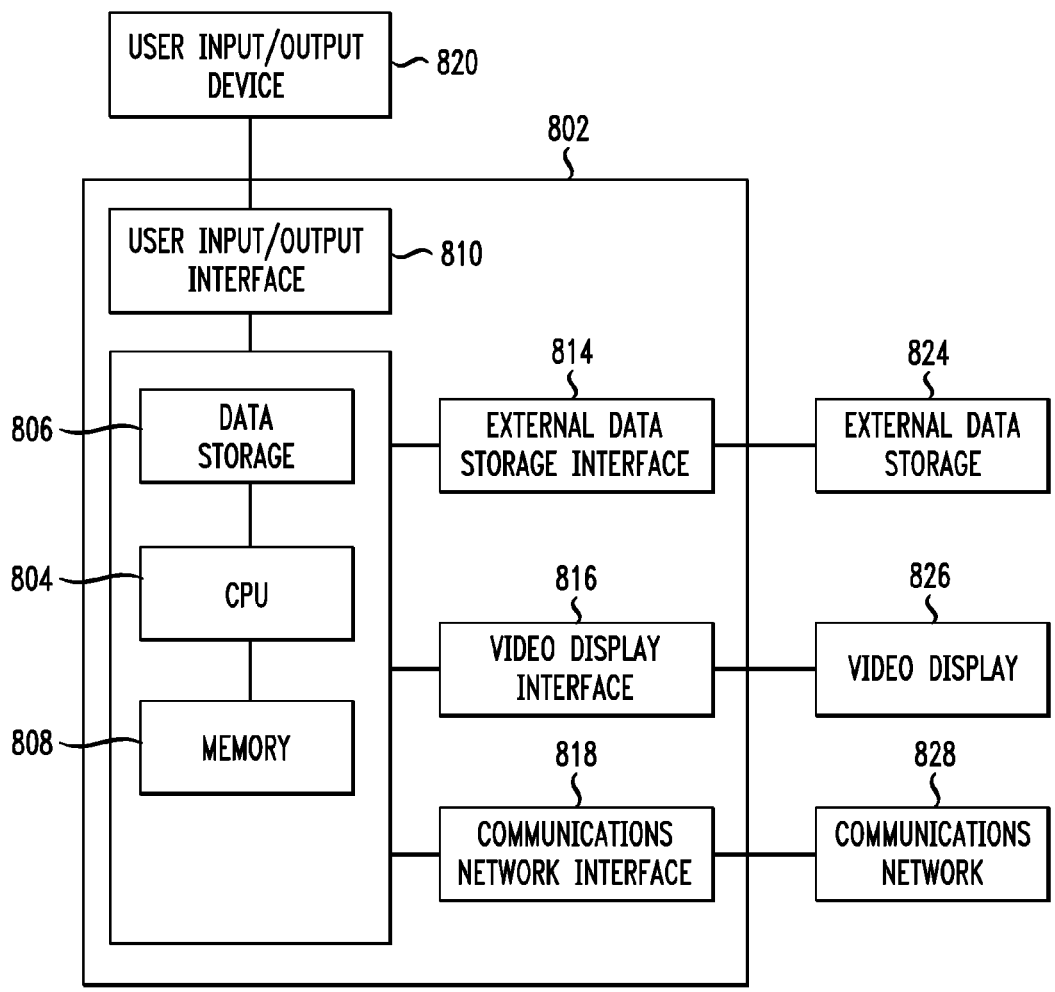
FIG. 8 shows a high-level schematic of a computer.

Embodiments of the invention may be implemented with a computer. As shown in FIG. 8, computer 802 may be any type of well-known computer comprising a central processing unit CPU 804, memory 808, data storage device 806, and user input/output interface 810. Data storage device 806 may comprise a hard drive, non-volatile memory, or other computer readable medium (such as a magnetic disk or compact disc read only memory). User input/output interface 810 may comprise a connection to a user input/output device 820, such as a keyboard or mouse, which enables user interaction with computer 802.

As is well known, a computer operates under control of computer software which defines the overall operation of the computer and applications. CPU 804 controls the overall operation of the computer and applications by executing computer program instructions which define the overall operation and applications. The computer program instructions may be stored in data storage device 806 and loaded into memory 808 when execution of the program instructions is desired. The method steps of FIG. 7 may be defined by the computer program instructions stored in the memory 808 or in the data storage device 806 (or in a combination of memory 808 and data storage device 806) and controlled by the CPU 804 executing the computer program instructions. For example, the computer program instructions may be implemented as computer executable code programmed by one skilled in the art to perform algorithms implementing the method steps of FIG. 7. Accordingly, by executing the computer program instructions, the CPU 804 executes algorithms implementing the method steps of FIG. 7.

Computer 802 may further comprise a video display interface 816, which may transform signals from CPU 804 to signals which may drive video display 826. Computer 802 may further comprise one or more network interfaces. For example, communications network interface 818 may comprise a connection to an Internet Protocol (IP) communications network 828, which may transport user, control, and test traffic. Communications network interface 818 may comprise various physical interfaces, including wired, wireless, and fiberoptic. Computer 802 may further comprise an external data storage interface 814. The results calculated from the algorithms may be transferred via external data storage interface 814 and stored in external data storage unit 824. One skilled in the art will recognize that an implementation of an actual computer may contain other components as well, and that FIG. 8 is a high level representation of some of the components of a computer for illustrative purposes.

Figure 9A:
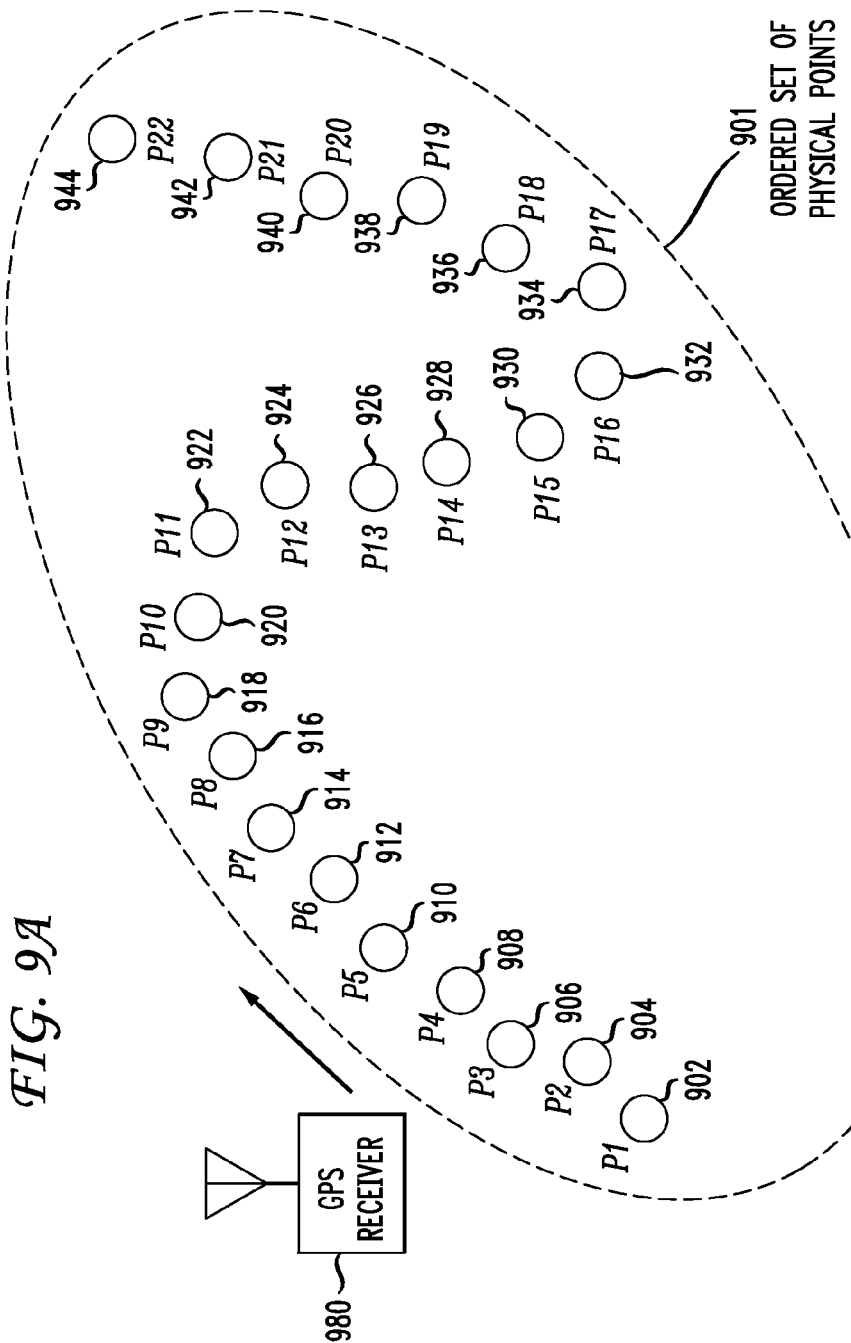
FIG. 9A shows the measurement of an ordered set of physical points by a mobile GPS receiver.

FIG. 9A and FIG. 9B illustrate a method for automatically guiding a vehicle, according to an embodiment of the invention. In FIG. 9A, a global positioning system (GPS) receiver 980 is moved incrementally along a user-specified path (such as a road) and records the coordinates of an ordered set of physical points 901 comprising physical points P1 902-P22 944. In FIG. 9B, the ordered set of physical points 901 is uploaded to computer 802. In one embodiment, data may be transmitted from GPS receiver 980 to computer 802 across a wireless interface. In another embodiment, data may be stored in GPS receiver 980 and transferred to computer 802 via a local user input/output interface 810 or a remote communications network interface 818 (FIG. 8). Computer 802 then executes computer instructions to perform steps of an algorithm according to an embodiment of the invention. Computer 802 transforms the input ordered set of physical points 901 to an output sequence of geometric elements 903 which approximate the ordered set of physical points 901. In this example, the sequence of geometric elements 903 comprises straight line segment L1 905, straight line segment L2 907, circular arc A1 909, straight line segment L3 911, circular arc A2 913, and straight line segment L4 915.

The sequence of geometric elements 903 is then downloaded to guidance control system 982, which is mounted on vehicle 984. In one embodiment, data is transferred from computer 802 to guidance control system 982 across a wireless interface. One skilled in the art may implement other system configurations. For example, GPS receiver 980, computer 802, and guidance control system 982 may be integrated into a single system mounted on vehicle 984. Guidance control system 982 controls a drive system which automatically drives vehicle 984 along guided route 931, which passes the ordered set of physical points 901. An automatically guided vehicle may be used in a variety of applications. For example, vehicle 984 may be a dozer used to grade a road. As another example, a camera system may be mounted on vehicle 984, which is then used for automatic surveillance.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for approximating an ordered set of physical points in physical space, each physical point comprising a nominal point and an associated allowable deviation, comprising performing with a computer the steps of:
   generating a first bundle of geometric elements connecting a first subgroup of physical points selected from the ordered set of physical points, wherein the deviation of each geometric element in the first bundle from each nominal point in the first subgroup is not greater than the allowable deviation associated with each nominal point in the first subgroup;
   mapping the first bundle to a first polytope in a parametric space, wherein each geometric element in the first bundle is mapped to a corresponding parametric point in the first polytope;
   generating a second bundle of geometric elements connecting a second subgroup of physical points selected from the ordered set of physical points, wherein the deviation of each geometric element in the second bundle from each nominal point in the second subgroup is not greater than the allowable deviation associated with each nominal point in the second subgroup; and
   mapping the second bundle to a second polytope in the parametric space, wherein each geometric element in the second bundle is mapped to a corresponding parametric point in the second polytope.

2. The method of claim 1, further comprising performing with the computer the steps of:
   determining a first intersection region between the first polytope and the second polytope;
   if the first intersection region is null:
      determining the center of the first polytope; and
      mapping the center of the first polytope to the corresponding geometric element;
   if the first intersection region is not null:
      generating a third bundle of geometric elements connecting a third subgroup of physical points selected from the ordered set of physical points, wherein the deviation of each geometric element in the third bundle from each nominal point in the third subgroup is not greater than the allowable deviation associated with each nominal point in the third subgroup; and
      mapping the third bundle to a third polytope in the parametric space, wherein each geometric element in the third bundle is mapped to a corresponding parametric point in the third polytope.

3. The method of claim 2, further comprising performing with the computer the steps of:
   determining a second intersection region between the first intersection region and the third polytope;
   if the second intersection region is null:
      determining the center of the first intersection region; and
      mapping the center of the first intersection region to the corresponding geometric element;
   if the second intersection region is not null:
      generating a fourth bundle of geometric elements connecting a fourth subgroup of physical points selected from the ordered set of physical points, wherein the deviation of each geometric element in the fourth bundle from each nominal point in the fourth subgroup is not greater than the allowable deviation associated with each nominal point in the fourth subgroup; and
      mapping the fourth bundle to a fourth polytope in the parametric space, wherein each geometric element in the fourth bundle is mapped to a corresponding parametric point in the fourth polytope.

4. The method of claim 1, wherein the polytope is a polyhedron.

5. The method of claim 1, wherein the polytope is a polygon.

6. The method of claim 1, wherein:
   the step of generating a first bundle of geometric elements comprises:
      generating a first bundle of straight line segments, wherein each specific straight line segment is a segment corresponding to a specific line defined by the equation $A_1 \ast x + B_1 \ast y + C_1 = 0$, wherein x and y are Cartesian axes in two-dimensional physical space and $(A_1, B_1, C_1)$ is a specific set of corresponding linear coefficients in the first bundle;
   the step of mapping the first bundle to a first polytope comprises:
      mapping each specific straight line segment in the first bundle to the specific parametric point defined by the specific set of coordinates $(C_1/B_1, A_1/B_1)$ in the parametric space;
   the step of generating a second bundle of geometric elements comprises:
      generating a second bundle of straight line segments, wherein each specific straight line segment is a segment corresponding to a specific line defined by the equation $A_2 \ast x + B_2 \ast y + C_2 = 0$, wherein $(A_2, B_2, C_2)$ is a specific set of linear coefficients in the second bundle; and
   the step of mapping the second bundle to a second polytope comprises:
      mapping each specific straight line segment in the second bundle to the specific parametric point defined by the specific set of coordinates $(C_2/B_2, A_2/B_2)$.

7. The method of claim 1, wherein:
   the step of generating a first bundle of geometric elements comprises:
      generating a first bundle of straight line segments, wherein each specific straight line segment is a segment corresponding to a specific line defined by the equation $A_1 \ast x + B_1 \ast y + C_1 = 0$, wherein x and y are Cartesian axes in two-dimensional physical space and $(A_1, B_1, C_1)$ is a specific set of corresponding linear coefficients in the first bundle;

the step of mapping the first bundle to a first polytope comprises:
    mapping each specific straight line segment in the first bundle to the specific parametric point defined by the specific set of coordinates $(C_1/A_1, B_1/A_1)$ in the parametric space;
the step of generating a second bundle of geometric elements comprises:
    generating a second bundle of straight line segments, wherein each specific straight line segment is a segment corresponding to a specific line defined by the equation $A_2*x + B_2*y + C_2 = 0$, wherein $(A_2, B_2, C_2)$ is a specific set of linear coefficients in the second bundle; and
the step of mapping the second bundle to a second polytope comprises:
    mapping each specific straight line segment in the second bundle to the specific parametric point defined by the specific set of coordinates $(C_2/A_2, B_2/A_2)$.

8. The method of claim 1, wherein:
the step of generating a first bundle of geometric elements comprises:
    generating a first bundle of circular arcs, wherein each circular arc in the first bundle has a corresponding center point and a corresponding radius;
the step of mapping the first bundle to a first polytope comprises:
    mapping each specific circular arc in the first bundle of circular arcs to the specific center point corresponding to the specific circular arc;
the step of generating a second bundle of geometric elements comprises:
    generating a second bundle of circular arcs, wherein each circular arc in the second bundle has a corresponding center point and a corresponding radius; and
the step of mapping the second bundle to a second polytope comprises:
    mapping each specific circular arc in the second bundle of circular arcs to the specific center point corresponding to the specific circular arc.

9. An apparatus for approximating an ordered set of physical points in physical space, each physical point comprising a nominal point and an associated allowable deviation, comprising:
    means for generating a first bundle of geometric elements connecting a first subgroup of physical points selected from the ordered set of physical points, wherein the deviation of each geometric element in the first bundle from each nominal point in the first subgroup is not greater than the allowable deviation associated with each nominal point in the first subgroup;
    means for mapping the first bundle to a first polytope in a parametric space, wherein each geometric element in the first bundle is mapped to a corresponding parametric point in the first polytope;
    means for generating a second bundle of geometric elements connecting a second subgroup of physical points selected from the ordered set of physical points, wherein the deviation of each geometric element in the second bundle from each nominal point in the second subgroup is not greater than the allowable deviation associated with each nominal point in the second subgroup; and
    means for mapping the second bundle to a second polytope in the parametric space, wherein each geometric element in the second bundle is mapped to a corresponding parametric point in the second polytope.

10. The apparatus of claim 9, further comprising:
    means for determining a first intersection region between the first polytope and the second polytope;
    means for determining the center of the first polytope;
    means for mapping the center of the first polytope to the corresponding geometric element;
    means for generating a third bundle of geometric elements connecting a third subgroup of physical points selected from the ordered set of physical points, wherein the deviation of each geometric element in the third bundle from each nominal point in the third subgroup is not greater than the allowable deviation associated with each nominal point in the third subgroup; and
    means for mapping the third bundle to a third polytope in the parametric space, wherein each geometric element in the third bundle is mapped to a corresponding parametric point in the third polytope.

11. The apparatus of claim 10, further comprising:
    means for determining a second intersection region between the first intersection region and the third polytope;
    means for determining the center of the first intersection region;
    means for mapping the center of the first intersection region to the corresponding geometric element;
    means for generating a fourth bundle of geometric elements connecting a fourth subgroup of physical points selected from the ordered set of physical points, wherein the deviation of each geometric element in the fourth bundle from each nominal point in the fourth subgroup is not greater than the allowable deviation associated with each nominal point in the fourth subgroup; and
    means for mapping the fourth bundle to a fourth polytope in the parametric space, wherein each geometric element in the fourth bundle is mapped to a corresponding parametric point in the fourth polytope.

12. The apparatus of claim 9, further comprising:
    means for generating a first bundle of straight line segments, wherein each specific straight line segment is a segment corresponding to a specific line defined by the equation $A_1*x + B_1*y + C_1 = 0$, wherein x and y are Cartesian axes in two-dimensional physical space and $(A_1, B_1, C_1)$ is a specific set of corresponding linear coefficients in the first bundle;
    means for mapping each specific straight line segment in the first bundle to the specific parametric point defined by the specific set of coordinates $(C_1/B_1, A_1/B_1)$ in the parametric space;
    means for generating a second bundle of straight line segments, wherein each specific straight line segment is a segment corresponding to a specific line defined by the equation $A_2*x + B_2*y + C_2 = 0$, wherein $(A_2, B_2, C_2)$ is a specific set of linear coefficients in the second bundle; and
    means for mapping each specific straight line segment in the second bundle to the specific parametric point defined by the specific set of coordinates $(C_2/B_2, A_2/B_2)$.

13. The apparatus of claim 9, further comprising:
    means for generating a first bundle of straight line segments, wherein each specific straight line segment is a segment corresponding to a specific line defined by the equation $A_1*x + B_1*y + C_1 = 0$, wherein x and y are Cartesian axes in two-dimensional physical space and $(A_1, B_1, C_1)$ is a specific set of corresponding linear coefficients in the first bundle;

means for mapping each specific straight line segment in the first bundle to the specific parametric point defined by the specific set of coordinates ($C_1/A_1$, $B_1/A_1$) in the parametric space;

means for generating a second bundle of straight line segments, wherein each specific straight line segment is a segment corresponding to a specific line defined by the equation $A_2{*}x+B_2{*}y+C_2=0$, wherein ($A_2$, $B_2$, $C_2$) is a specific set of linear coefficients in the second bundle; and means for mapping each specific straight line segment in the second bundle to the specific parametric point defined by the specific set of coordinates ($C_2/A_2$, $B_2/A_2$).

14. The apparatus of claim 9, further comprising:

means for generating a first bundle of circular arcs, wherein each circular arc in the first bundle has a corresponding center point and a corresponding radius;

means for mapping each specific circular arc in the first bundle of circular arcs to the specific center point corresponding to the specific circular arc;

means for generating a second bundle of circular arcs, wherein each circular arc in the second bundle has a corresponding center point and a corresponding radius; and means for mapping each specific circular arc in the second bundle of circular arcs to the specific center point corresponding to the specific circular arc.

15. A non-transitory computer readable medium storing computer instructions for approximating an ordered set of physical points in physical space, each physical point comprising a nominal point and an associated allowable deviation, the computer instructions defining the steps of:

generating a first bundle of geometric elements connecting a first subgroup of physical points selected from the ordered set of physical points, wherein the deviation of each geometric element in the first bundle from each nominal point in the first subgroup is not greater than the allowable deviation associated with each nominal point in the first subgroup;

mapping the first bundle to a first polytope in a parametric space, wherein each geometric element in the first bundle is mapped to a corresponding parametric point in the first polytope;

generating a second bundle of geometric elements connecting a second subgroup of physical points selected from the ordered set of physical points, wherein the deviation of each geometric element in the second bundle from each nominal point in the second subgroup is not greater than the allowable deviation associated with each nominal point in the second subgroup; and mapping the second bundle to a second polytope in the parametric space, wherein each geometric element in the second bundle is mapped to a corresponding parametric point in the second polytope.

16. The non-transitory computer readable medium of claim 15, wherein the computer program instructions further comprise computer program instructions defining the steps of:

determining a first intersection region between the first polytope and the second polytope;

if the first intersection region is null:
determining the center of the first polytope; and
mapping the center of the first polytope to the corresponding geometric element;

if the first intersection region is not null:
generating a third bundle of geometric elements connecting a third subgroup of physical points selected from the ordered set of physical points, wherein the deviation of each geometric element in the third bundle from each nominal point in the third subgroup is not greater than the allowable deviation associated with each nominal point in the third subgroup; and mapping the third bundle to a third polytope in the parametric space, wherein each geometric element in the third bundle is mapped to a corresponding parametric point in the third polytope.

17. The non-transitory computer readable medium of claim 16, wherein the computer program instructions further comprise computer program instructions defining the steps of:

determining a second intersection region between the first intersection region and the third polytope;

if the second intersection region is null:
determining the center of the first intersection region; and
mapping the center of the first intersection region to the corresponding geometric element;

if the second intersection region is not null:
generating a fourth bundle of geometric elements connecting a fourth subgroup of physical points selected from the ordered set of physical points, wherein the deviation of each geometric element in the fourth bundle from each nominal point in the fourth subgroup is not greater than the allowable deviation associated with each nominal point in the fourth subgroup; and mapping the fourth bundle to a fourth polytope in the parametric space, wherein each geometric element in the fourth bundle is mapped to a corresponding parametric point in the fourth polytope.

18. The non-transitory computer readable medium of claim 15, wherein the computer program instructions further comprise computer program instructions defining the steps of:

generating a first bundle of straight line segments, wherein each specific straight line segment is a segment corresponding to a specific line defined by the equation $A_1{*}x+B_1{*}y+C_1=0$, wherein x and y are Cartesian axes in two-dimensional physical space and ($A_1$, $B_1$, $C_1$) is a specific set of corresponding linear coefficients in the first bundle;

mapping each specific straight line segment in the first bundle to the specific parametric point defined by the specific set of coordinates ($C_1/B_1$, $A_1/B_1$) in the parametric space;

generating a second bundle of straight line segments, wherein each specific straight line segment is a segment corresponding to a specific line defined by the equation $A_2{*}x+B_2{*}y+C_2=0$, wherein ($A_2$, $B_2$, $C_2$) is a specific set of linear coefficients in the second bundle; and mapping each specific straight line segment in the second bundle to the specific parametric point defined by the specific set of coordinates ($C_2/B_2$, $A_2/B_2$).

19. The non-transitory computer readable medium of claim 15, wherein the computer program instructions further comprise computer program instructions defining the steps of:

generating a first bundle of straight line segments, wherein each specific straight line segment is a segment corresponding to a specific line defined by the equation $A_1{*}x+B_1{*}y+C_1=0$, wherein x and y are Cartesian axes in two-dimensional physical space and ($A_1$, $B_1$, $C_1$) is a specific set of corresponding linear coefficients in the first bundle;

mapping each specific straight line segment in the first bundle to the specific parametric point defined by the specific set of coordinates $(C_1/A_1, B_1/A_1)$ in the parametric space;

generating a second bundle of straight line segments, wherein each specific straight line segment is a segment corresponding to a specific line defined by the equation $A_2*x+B_2*y+C_2=0$, wherein $(A_2, B_2, C_2)$ is a specific set of linear coefficients in the second bundle; and mapping each specific straight line segment in the second bundle to the specific parametric point defined by the specific set of coordinates $(C_2/A_2, B_2/A_2)$.

20. The non-transitory computer readable medium of claim 15, wherein the computer program instructions further comprise computer program instructions defining the steps of:

generating a first bundle of circular arcs, wherein each circular arc in the first bundle has a corresponding center point and a corresponding radius;

mapping each specific circular arc in the first bundle of circular arcs to the specific center point corresponding to the specific circular arc;

generating a second bundle of circular arcs, wherein each circular arc in the second bundle has a corresponding center point and a corresponding radius; and mapping each specific circular arc in the second bundle of circular arcs to the specific center point corresponding to the specific circular arc.

* * * * *